United States Patent [19]
Nonomura

[11] Patent Number: 5,838,460
[45] Date of Patent: Nov. 17, 1998

[54] FACSIMILE MACHINE

[75] Inventor: Yutaka Nonomura, Iwakura, Japan

[73] Assignee: Brother Kogyo Kabushiki Kaisha, Nagoya, Japan

[21] Appl. No.: 439,373

[22] Filed: May 11, 1995

[30] Foreign Application Priority Data

May 12, 1994 [JP] Japan .................................. 6-123029

[51] Int. Cl.⁶ .................................................... H04N 1/32
[52] U.S. Cl. ........................................... 358/407; 358/400
[58] Field of Search .................. 358/400, 402, 358/407, 434, 438

[56] References Cited

U.S. PATENT DOCUMENTS

| | | | |
|---|---|---|---|
| 5,257,112 | 10/1993 | Okada | 358/407 |
| 5,291,302 | 3/1994 | Gordon et al. | 358/407 |
| 5,404,231 | 4/1995 | Bloomfield | 358/400 |
| 5,481,737 | 1/1996 | Ikeguchi et al. | 358/434 |

*Primary Examiner*—David K. Moore
*Assistant Examiner*—Stephen Brinich
*Attorney, Agent, or Firm*—Oliff & Berridge, PLC

[57] ABSTRACT

Upon receiving a command for changing a target facsimile machine (Yes in S103), the present facsimile machine 1 receives the new forwarding number (S105–S108). The present facsimile machine 1 changes a forwarding number stored in the EEPROM 18 to the newly inputted forwarding number. Then, the present facsimile machine 1 starts receiving incoming image information from remote facsimile machines (S111) and stores them into the RAM 16. Upon receiving a command for transmission of a status list (Yes in S113), the present facsimile machine 1 produces a status list indicating the newly-stored forwarding number (S115). Then, the present facsimile machine 1 transmits the status list to a remote facsimile machine which has transmitted the status list transmission command. The user existing at that remote facsimile machine visually confirms the newly-stored forwarding number appearing on the status list, and transmits a transmission start command to the present facsimile machine 1. Upon receiving the transmission start command (Yes in S117), the present facsimile machine 1 starts transmitting the image information presently stored in the RAM 16 (S119).

14 Claims, 7 Drawing Sheets

```
=== STATUS LIST ===

TO:  _______________
FAX FORWARD:  0-0123456789
       FROM:  ABC COMPANY
        FAX:  0-xxx-xxx-3333
```

FACSIMILE MACHINE

BACKGROUND OF THE INVENTION

1. Field of the Invention

The present invention relates to a facsimile machine and more particularly to a facsimile machine capable of forwarding information received from one remote facsimile machine to another remote facsimile machine.

2. Description of the Related Art

There has been a facsimile machine capable of receiving information from one remote facsimile machine and forwarding the information to a different target facsimile machine. The facsimile machine can be inputted with the telephone number of the target facsimile machine (to which information is to be forwarded) either directly using the operation panel of the facsimile machine or by remote control from a remote facsimile machine.

Next, an explanation of a remote-control type of facsimile machine will be provided. In this example, a user has set a facsimile machine at location A to forward incoming facsimile messages to a facsimile machine at a location B, but later travels to a location C. Using the telephone furnished to facsimile machine at location C, the user telephones the facsimile machine at location A. Once connected, the user uses the numeric pad of the telephone to input a special number for commanding a change in target facsimile machine. The user then inputs the telephone number of the facsimile machine at location C to which the user wants information forwarded.

However, there has been known a problem with this type of facsimile machine in that users may incorrectly input the telephone number of the target facsimile machine. If the incorrect number is for a telephone line not connected to a facsimile machine, the facsimile machine will repeatedly telephone the inputted telephone number, annoying the owner of the telephone line. If the incorrect number is for a telephone line connected to a facsimile machine, information may be accidentally transmitted to an unknown person or irretrievably lost.

SUMMARY OF THE INVENTION

In an attempt to prevent this problem, numbers inputted using the numeric pad can be reproduced in an artificial spoken voice. For example, if the user inputs the number "0, 0, . . . ." the facsimile machine will reproduce a voice that says, "Zero, zero, . . . ." This allows the user to confirm the inputted number.

However, such "verbal" messages are easily misunderstood, so the user may not detect that he or she has inputted a telephone number incorrectly. Therefore, the problems described still remain. Also, to produce the artificial voice requires addition of a voice circuit or special information for synthesizing the human voice. These raise the cost of the facsimile machine.

It is therefore an objective of the present invention to solve the above-described problems and to provide a facsimile machine wherein inputted telephone numbers of target facsimile machines to which information is desired to be forwarded can be visually confirmed.

It is another objective of the present invention to provide a facsimile machine wherein information will not be transmitted to an accidentally inputted incorrect telephone number.

It is still another objective of the present invention to provide an inexpensive facsimile machine with a forwarding function.

In order to attain the above objects and other objects, the present invention provides a facsimile machine capable of forwarding image information received from remote facsimile machines to a desired target facsimile machine, the facsimile machine comprising: reception means for receiving a telephone number of a target facsimile machine, to which image information is desired to be forwarded; storage means for storing the received telephone number of the target facsimile machine; distinction image information preparation means for preparing information on a distinction image which includes an image of the new telephone number stored in the storage means; and distinction image information transmission means for transmitting the distinction image information prepared by the distinction image information preparation means.

According to another aspect, the present invention provides a facsimile machine capable of forwarding image information received from remote facsimile machines to a desired target facsimile machine, the facsimile machine comprising: storage means for storing a telephone number of a target facsimile machine; reception means for receiving a new telephone number of a new target facsimile machine, to which incoming image information is newly desired to be forwarded; target changing means for changing the telephone number stored in the storage means to the new telephone number received by the reception means; image information memory means for storing incoming image information received from remote facsimile machines; information preparation means for preparing distinction information which includes information on the new telephone number stored in the storage means; distinction information transmission means for transmitting the distinction information; image information transmission means for transmitting the incoming image information stored in the image information memory means to a target facsimile machine, a telephone number of which is being presently stored in the storage means; and control means for controlling the image information transmission means to stop transmitting the incoming image information after the target changing means changes the telephone number stored in the storage means to the new telephone number received by the reception means and until the reception means receives a transmission start command for requesting transmission of the incoming image information.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

A facsimile machine according to a preferred embodiment of the present invention will be described while referring to the accompanying drawings wherein like parts and components are designated by the same reference numerals to avoid duplicating description.

Figure 1:
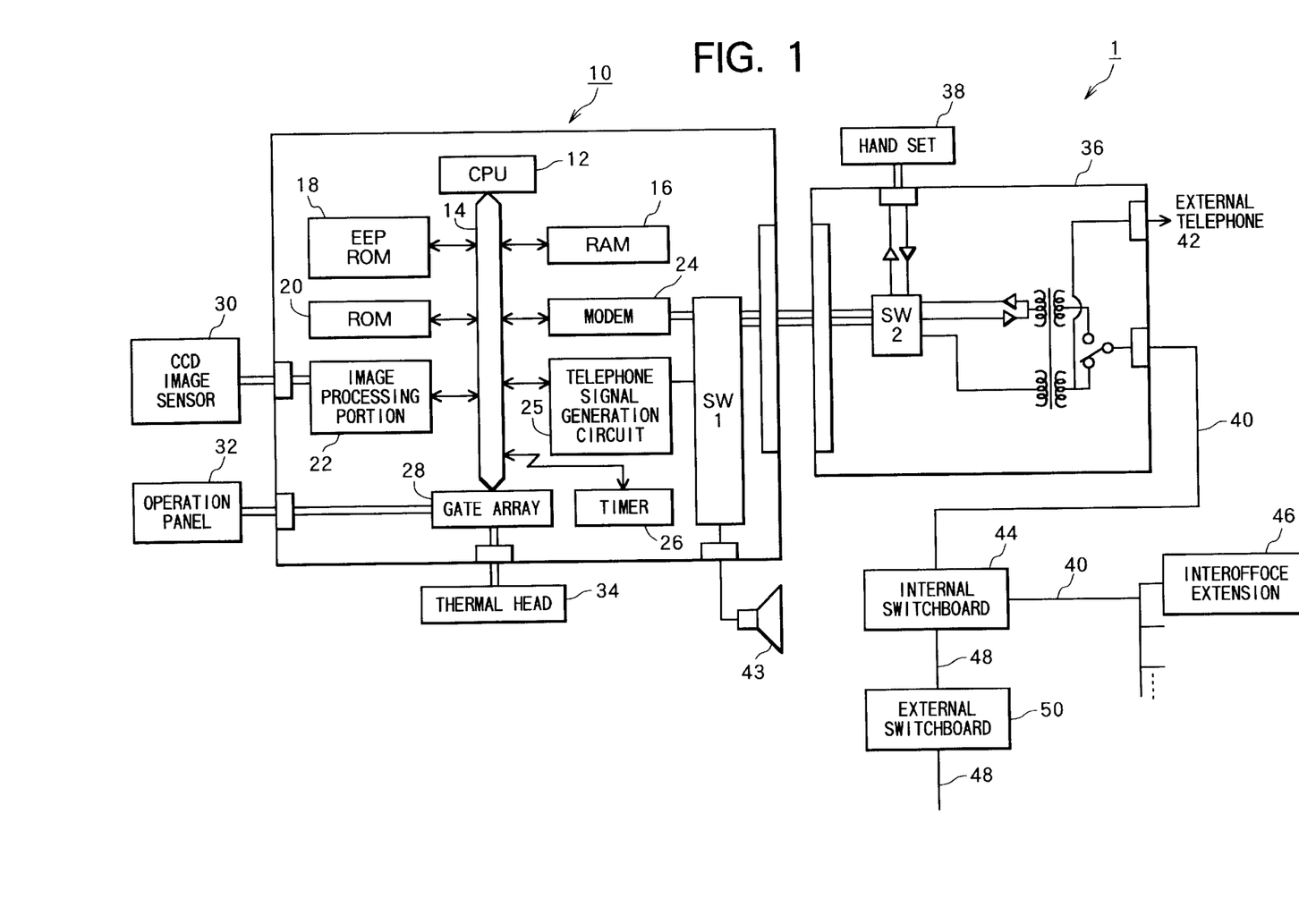
FIG. 1 is a block diagram of a facsimile machine of a preferred embodiment of the present invention.

FIG. 1 schematically shows the configuration of electrical components of the facsimile machine 1 of the first embodiment. The facsimile machine 1 includes: a control portion 10; a network control unit (NCU) 36; a speaker 43; and a handset 38.

The network control unit 36 is connected to an interoffice telephone line 40. The interoffice telephone line 40 is connected to an internal switchboard 44. Several numbers of interoffice extensions 46 are also connected to the internal switchboard 44. The internal switchboard 44 is connected to an outside telephone line 48. An external switchboard or telephone exchange 50 is connected to the outside telephone line 98.

The network control unit 36 is also connected to an external telephone 42.

The control portion 10 mainly includes a CPU 12; a RAM 16; a EEPROM (electrically erasable/programmable read only memory 18; a ROM 20; an image processing portion 22; a modem 24; a telephone number signal generation circuit 25; a timer 26; and a gate array 28 which are all connected to a bus line 14. The RAM 16 is for temporarily storing incoming image information from a remote facsimile machine. The EEPROM 18 is for storing data of telephone number of a target facsimile machine to which the incoming image information is to be forwarded. The telephone number of the target facsimile machine will be referred to as a "forwarding number" hereinafter. The ROM 20 prestores control programs such as various control routines for controlling the CPU 12.

The image processing portion 22 is connected to a charge-coupled device (CCD) image sensor 30 for reading a document to be transmitted. The gate array 28 is connected to an operation panel 32 and a thermal head 34. The operation panel 32 is provided with a numeric pad and several function keys (not shown) for inputting various commands to the facsimile machine. The operation panel 32 is further provided with a liquid crystal display (LCD) for displaying various informations. The thermal head 34 is for recording image information onto recording sheets.

The modem 24 is connected to the NCU 36 via a switch SW1. The switch SW1 is also connected to the speaker 43. The switch SW1 is for switching in response to a command from the CPU 12 so that the modem 24 can be selectively connected to the NCU 36 or to the speaker 43.

The NCU 36 is for performing a dialing function and a signal detection function. The NCU 36 is for mediating transmission and reception of information between the modem 24 and the telephone line 40. Among other functions, the NCU 36 transmits signals in a format suitable for the telephone line 40 and detects signals incoming over the telephone line 40. The NCU 36 is connected to the handset 38 so that a user of the facsimile machine can communicate with a remote facsimile machine.

A switch SW2 is provided to the NCU 36 for selectively connecting the interoffice telephone line 40 either to the modem 24, the handset 38, or the external telephone 42. When the switch SW2 is switched from the handset 38 to the modem 24, data inputted from the interoffice telephone circuit 40 can be inputted to the modem 24.

The modem 24 is for performing modulating/demodulating function. The modulating/demodulating function includes; modulating function for modulating digital signals into analog signals and outputting them to the interoffice telephone line 40 via the NCU 36; and demodulating function for demodulating analog signals inputted from the interoffice telephone line 40 into digital signals. The modem 24 may be further provided with a sound digitalization function and a sound reproducing function. The sound digitalization function is for converting analog sound data transmitted from the interoffice telephone line 40 into digital sound data. The sound reproducing function is for reproducing digital sound data into analog sound data.

The telephone number signal generation circuit 25 is for generating a telephone number signal (DTMF (dual tone multi-frequency) signal or dial pulse signal) when a forwarding number for a target facsimile machine is inputted. The following description will be given for an example that the circuit 25 generates a DTMF signal. That is, the telephone number signal generating circuit 25 generates a DTMF signal representative of the inputted forwarding number. The DTMF signal generated by the telephone number signal circuit 25 is transmitted to the interoffice telephone line 40 via the NCU 36. Receiving the DTMF signal, the external switchboard 50 will generate a ringing sequence to the target facsimile machine corresponding to the forwarding telephone number.

Because the present facsimile machine 1 is connected to the outside telephone line 48 via the internal switchboard 44, the forwarding number includes not only a telephone number of the target facsimile machine but also a number "0" and a pause code "*". The number "0" is for actuating the internal switchboard 44 to connect the facsimile machine 1 with the outside line 48. The pause code "*" is for ensuring that the signal generating circuit 25 outputs the DTMF signals for the telephone number only after when the facsimile machine 1 is connected to the external switchboard 50 via the outside telephone line 48. The forwarding number should further include an end code "#" for indicating an end of the forwarding number.

It is noted that in order to transmit image information of a document read by the CCD image sensor 30 to a remote facsimile machine, a telephone number of a remote facsimile machine, to which the information is desired to be transmitted, can be manually inputted to the telephone number signal generating circuit 25 from the operation panel 32.

The speaker 43 is for outputting sounds such as ringing signals.

Figure 2:
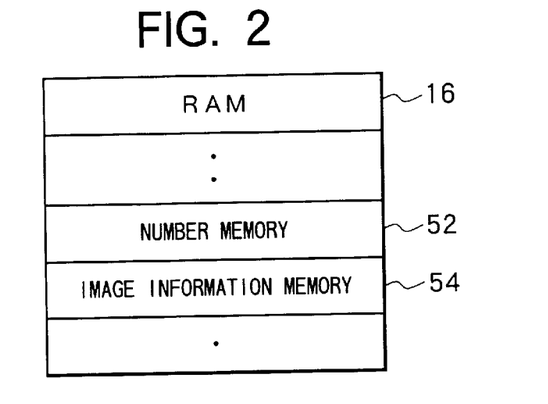
FIG. 2 schematically shows the contents of a RAM.
Figure 3:
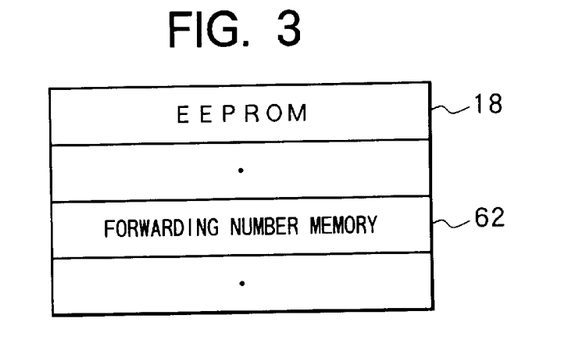
FIG. 3 schematically shows the contents of an EEPROM.
Figure 4:
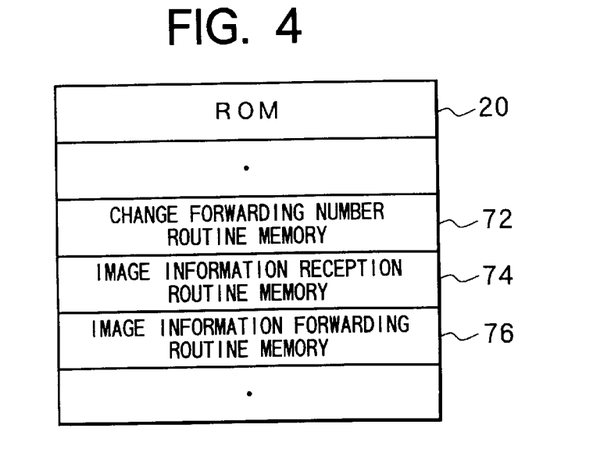
FIG. 4 schematically shows the contents of a ROM.

As can be seen in FIG. 2, the RAM 16 includes a number memory 52 for storing inputted telephone numbers and an image information memory 54 for temporarily storing image information transmitted from a remote facsimile machine. As can be seen in FIG. 3, the EEPROM 18 includes a forwarding number memory 62 for storing the telephone number of a target facsimile machine to which image information is to be forwarded. As can be seen in FIG. 4, the ROM 20 includes a change forwarding number routine memory 72 for storing a change forwarding number routine of FIG. 5; an image reception routine memory 74 for storing an image reception routine of FIG. 7; and an image forwarding routine memory 76 for storing an image forwarding routine of FIG. 9.

The CPU 12 is for controlling an entire portion of the facsimile machine. According to the present invention, the CPU 12 executes the change forwarding number routine of FIG. 5 to change the target facsimile machine to which information is to be forwarded. It is noted that the CPU continually executes the change forwarding number routine while power of the present facsimile machine 1 is ON. In other words, the CPU continually executes the standby state of S100 for waiting ringing signals The CPU 12 executes the image receiving routine of FIG. 7 to receive incoming image information during an image reception mode is ON. It is noted that the CPU continually executes the image forwarding routine while the reception mode is ON. In other words, the CPU continually executes the standby state of S151 for waiting ringing signals during the reception mode is ON. In the image receiving routine, the CPU 12 forwards the incoming image information only when an image forwarding mode is also ON. The CPU 12 executes the image forwarding routine of FIG. 9 to forward image information when the image forwarding mode is ON.

The CPU 12 further encodes data of a document read by the CCD image sensor 30. The CPU 12 encodes the document data, according to the format of the remote facsimile machine (for example, to an MH (Modified Huffman), MR (Modified READ), or MMR (Modified MR) format), and then compresses the data. The CPU 12 is also for decoding incoming information into a form for output onto a recording sheet. That is, the CPU 12 decodes information received from a remote facsimile machine which has been encoded according to the encoding format of the remote facsimile machine, and outputs the decoded information to the thermal head 34.

In the present facsimile machine 1, a predetermined number, "954" for example, to be inputted from a remote facsimile machine or a remote telephone is allotted to a command signal to request change in the target facsimile machine to which information is desired to be forwarded. Another number, "961" for example, is allotted to a command signal to request transmission of a status list showing the telephone number inputted for new target facsimile machine. A still another number, "955," for example, is allotted to a command signal to confirm the forwarding number shown in the status list.

Figure 5:
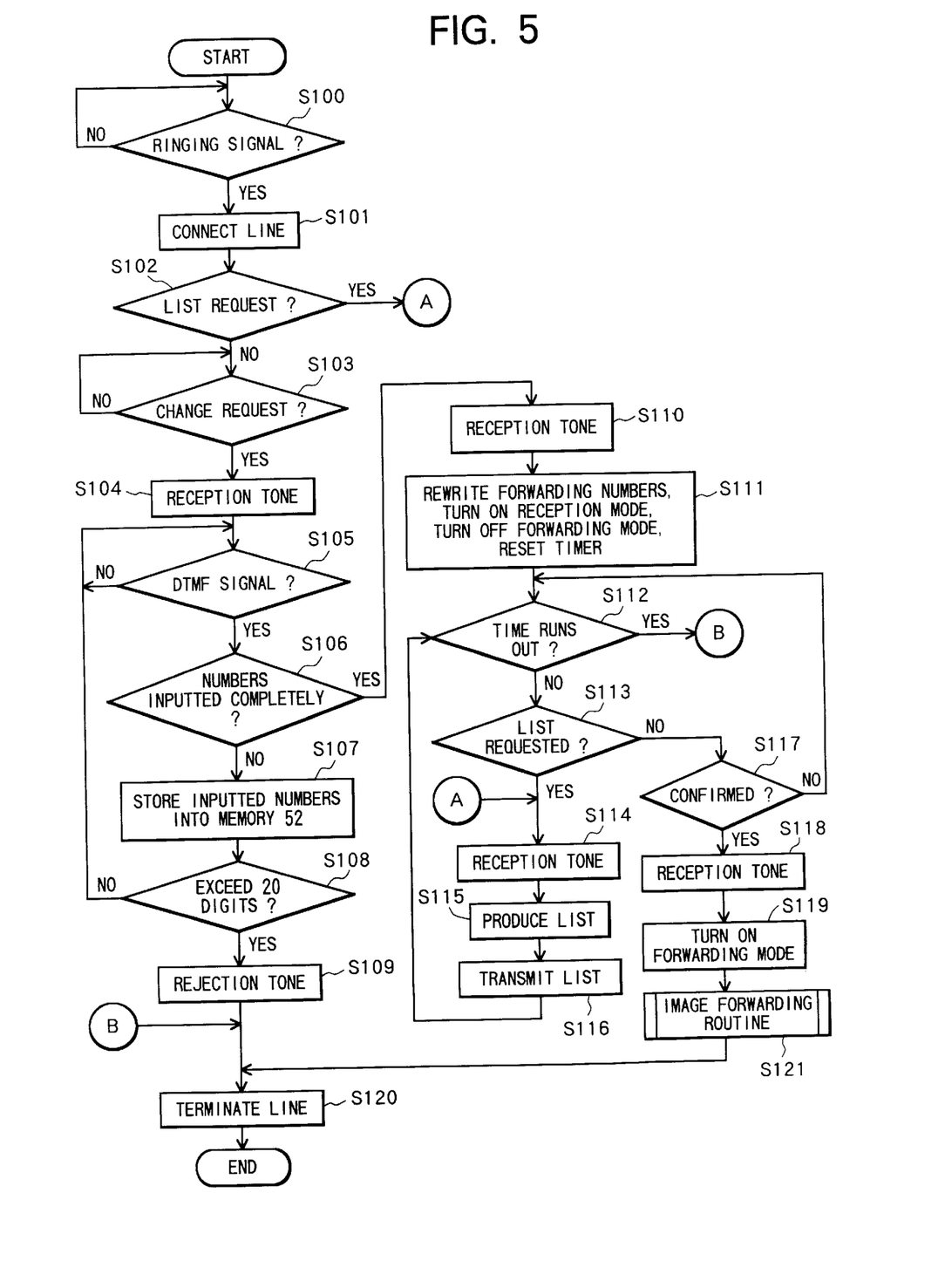
FIG. 5 is a flowchart of a change forwarding number routine.

With the above-described structure, the present facsimile machine 1 changes a forwarding number, by performing the change forwarding number routine of FIG. 5. According to the change forwarding number routine, the facsimile machine 1 changes the forwarding number, upon receiving the command signal from a remote facsimile machine for changing the target facsimile machine. The CPU 12 receives a forwarding number of a target facsimile machine, to which image information is desired to be forwarded. The CPU 12 then replaces a forwarding number already stored in the EEPROM 18 with a newly-inputted forwarding number. As a result, the image receiving mode is turned ON, and the image forwarding mode is turned OFF. Then, the CPU executes the image receiving routine of FIG. 7 for receiving incoming image information transmitted from a remote facsimile machine and for storing the image information into the RAM 16. At this stage during the image forwarding mode is OFF, the image information is retained in the RAM 16 but not forwarded to the target facsimile machine. Then, in response to the user's request for transmission of a status list, the CPU 12 transmits a status list showing the inputted forwarding number to a remote facsimile machine where the user locates. If the status list shows the correct forwarding number, the user transmits a signal confirming the inputted forwarding number to the present facsimile machine 1. Upon receiving this confirmation signal, the image forwarding mode is turned ON. As a result, the CPU 12 executes the image forwarding routine of FIG. 9 to forward, to the newly-set target facsimile machine, the incoming image information which has been received during the image forwarding mode is OFF and which has been stored in the RAM 16. When receiving other incoming image information from a remote facsimile machine at this stage, the CPU 12 executes the image receiving routine of FIG. 7 to receive the incoming image information and then to forward the image information to the new target facsimile machine.

Next, an explanation of the change forwarding number routine executed when a command is received to change the target facsimile machine will be provided while referring to the flowchart in FIG. 5. In this example, a user has set the present facsimile machine 1 to forward incoming messages to a facsimile machine at location B (referred to as facsimile machine B hereinafter) That is, the telephone number of the facsimile machine B has been stored in the EEPROM 18. The user's schedule requires him or her to go from location B to location C so that he or she must command the present facsimile machine 1 to forward incoming messages to a facsimile machine at location C (referred to as facsimile machine C hereinafter).

According to the present embodiment, the user can command the present facsimile machine 1 from a remote facsimile machine, such as the facsimile machine B, the facsimile machine C, or other remote facsimile machines, or from a remote telephone.

The change forwarding number routine will be described below with reference to FIG. 5, assuming that the user transmits command for changing the target facsimile machine to the present facsimile machine 1 from the facsimile machine B.

First, the user lifts the handset of facsimile machine B and listens for the dial tone. Then, using the numeric pad, the user dials the telephone number of the present facsimile machine. A ringing signal will be transmitted to the present facsimile machine from the telephone line 40. When the present facsimile machine receives the ringing signal (i.e., S100 is YES), the CPU 12 controls the NCU 36 to connect with the telephone line 40 in S101 so that input from the telephone line 40 is possible.

Next, whether or not the user inputs a request for a status list is determined in S102. That is, S102 judges whether the number "961" (status request command signal) is transmitted from the facsimile machine B. If instead the user requests a change in the target facsimile machine by inputting via the numeric pad the predetermined number "954", the determination in S102 will be NO and the program will proceed to S103. S103 then judges whether or not a change in the target facsimile machine has been requested is determined. That is, S103 judges whether the number "954" (target facsimile machine change request command signal) is transmitted from the facsimile machine B. Because the user has inputted the number "954," S103 will result in a YES determination so that the CPU 12 transmits a reception tone, generated by an internal oscillation circuit (not shown), to the facsimile machine B in S104. This reception tone informs the user that the present facsimile machine 1 has acknowledged his or her request to change the target facsimile machine to which messages are to be forwarded and is prepared for input of the new target facsimile machine.

Using the numeric pad, the user inputs the telephone number of facsimile machine C. In this example, the telephone number of facsimile machine C is 012-345-6789 where 012 is area code. Because the present facsimile machine 1 is connected via the internal switchboard 44 for interoffice extensions to the outside line 48, the telephone number must be inputted with the number "0" to connect the facsimile machine 1 with the outside line 48. Therefore, the user first presses "0" on the numeric pad. As a result, the facsimile machine B transmits the DTMF signal for the number "0" to the present facsimile machine 1. This produces a YES determination in S105, whereupon whether or not the telephone number has been completely inputted is determined in S106. At this point, only the number "0" has been inputted (i.e., S106 is NO) so that the program proceeds to S107, where the CPU 12 stores the inputted "0" into the number memory 52 of the RAM 16. Because the number of digits that can be inputted to the present facsimile machine is limited to a maximum of 20 digits, for example, S108 judges whether or not the inputted telephone number has exceeded 20 digits. Because only the number "0" has been inputted at this stage (i.e., S108 is NO), the program returns to S105.

Before the user continues inputting telephone numbers after inputting the number "0," he or she depresses the "*" key on the numeric pad to generate a pause signal (to be described later), The facsimile machine B outputs the DTMF signal for the "*" key, resulting in a YES determination in S105. The determination in S106 will again be NO at this point so that in S107 the CPU 12 stores the inputted mark "*" (pause signal) into the number memory 52 of the RAM 16. The determination in S105 will again be NO at this point so that the program returns to S105. Next, the user inputs the telephone number of the facsimile machine C, whereupon the inputted all the numbers "0*0123456789" will be stored in the number memory 52 by repeated executions of S105 through S108.

To indicate that the telephone number has been completely inputted, the user depresses the "#" key on the numeric pad of the facsimile machine B. When the present facsimile machine 1 receives from the facsimile machine B a DTMF signal for the "#" key (i.e., S106 is YES), in S110 the CPU 12 outputs to the facsimile machine B a reception tone generated at the oscillation circuit. When the user hears the reception tone, he or she will know that the telephone number for the facsimile machine C will be completely registered.

On the other hand, if the user inputs more than 20 digits, the CPU 12 will generate a rejection tone using the internal oscillation circuit and output the rejection tone to the facsimile machine B, in S109. The rejection tone will inform the user that the inputted telephone number can not be registered.

In S111, the CPU 12 rewrites the telephone number already stored in the forwarding number memory 62 (i.e., telephone number of the facsimile machine B) to the telephone number "0*0123456789" now stored in the telephone number memory 52 of the RAM 16 (i.e., telephone number of the facsimile machine C). Therefore, the target facsimile machine to which facsimile messages are to be forwarded is changed from the facsimile machine B to the facsimile machine C. Also in S111, the image reception mode is turned ON, the image forwarding mode is turned OFF, and the timer 26 is reset to zero so that the present facsimile machine 1 will store image informations into the image information memory 54 when receiving the image information from now on.

Next, whether or not the timer 26 has reached a predetermined duration of time, one minute for example, is determined in S112. Until time runs out, the CPU 12 waits for the user to request a status list by repeatedly repeating S112, S113, and S117. When the user uses the numeric pad to input the predetermined number "961" for requesting a status list (i.e., S113 is YES), the CPU 12 causes the oscillation circuit to generate a reception signal and transmits the reception signal to the facsimile machine B in S114. The signal informs the user that the present facsimile machine 1 will transmit a status list to the facsimile machine B.

Figure 6:
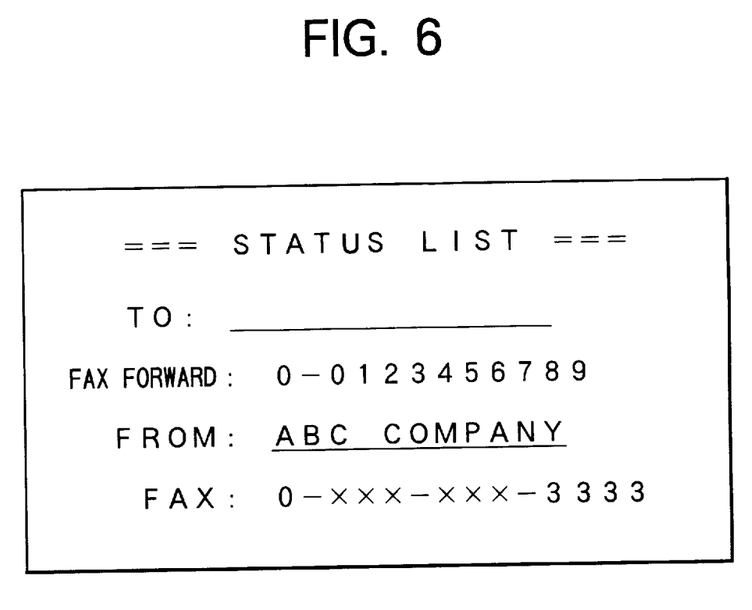
FIG. 6 shows a status list transmitted according to the present embodiment.

In S115, the CPU 12 prepares or produces image information on a status list to be transmitted to the facsimile machine B. In addition to the forwarding number described above, the EEPROM 18 holds a telephone number of the present facsimile machine 1. As can be seen in the example status list shown in FIG. 6, the CPU 12 produces image information on the status list so that the status list includes the telephone number of the present facsimile machine 1 ("0-XXX-XXXX-3333" in this example) in addition to the forwarding number "0-1234556789."

Next, the CPU 12 transmits in S116 the image information for the status list to the facsimile machine B. In response to this, the user depresses the start reception switch on the facsimile machine B without replacing the handset on the hook. The facsimile machine B thereby receives and prints out the status list. By visually confirming the telephone number of the new target facsimile machine on the status list, the user can confirm that the desired forwarding number is correctly registered in the present facsimile machine 1. After completion of S116, the program returns to S112.

Until the timer 26 reaches the predetermined time, the determination in S112 will remain NO. Also, because the user has already requested the status list, the determination in S113 will also remain NO. After the user confirms that the telephone number for new target facsimile machine C is listed correctly on the status list, he or she inputs using the numeric pad of the facsimile machine B the number "955" for confirming the correct number. This results in a YES determination in S117, where whether or not the confirmation number "955" has been inputted is determined. The program then proceeds to S118, where the CPU 12 transmits a reception tone to the facsimile machine B. This tone informs the user that the image forwarding mode is turned ON in the present facsimile machine 1. The CPU 12 then turns ON the image forwarding mode in S119 to perform an image forwarding routine of FIG. 9 (which will be described later) in S121. Then, in S120, the CPU 12 controls the NCU 36 to disconnect the telephone line in S120. This brings the forwarding number change routine to an end.

On the other hand, if the telephone number listed on the status list is incorrect so the user does not input the confirmation number, the determination in S117 will continue to be NO until the time monitored by the timer 26 runs out. When time runs out and the determination in S112 is YES, the program will proceed to S120, where the CPU 12 controls the NCU 36 to disconnect the telephone line in S120, thereby bringing the target number change routine to an end. The user can then again try and input the correct telephone number for facsimile machine C by again going through the above-described processes. When the transmitted status list shows that the correct telephone number, the user inputs the confirmation number (i.e., S117 is YES), the CPU 12 transmits the reception tone to the facsimile machine B in S118, and the forwarding mode is turned ON in S119 to execute the image forwarding routine in S121.

To facilitate explanation, the example shown in FIG. 5 shows the change in target facsimile machine, the request for a status list, and confirmation of the telephone number serially performed. However, the program could be designed to allow the user to again attempt inputting the correct telephone number after incorrectly inputting the number in a previous attempt. In this case the telephone line would not be disconnected until the user confirms that telephone number he or she inputted is correct.

Next, an explanation of processes of the forwarding number change routine the user follows to change the target facsimile machine when telephoning from a telephone will be provided while again referring to FIG. 5. In the following example, it will be assumed that the user has set the present facsimile machine 1 to forward incoming messages to the facsimile machine B. While traveling from location B to location C, the user telephones the present facsimile machine 1 using a portable telephone D to change the target facsimile machine from facsimile machine B to the facsimile machine C.

The user dials the telephone number of the facsimile machine 1 on the numeric pad of the portable telephone D. A ringing signal is transmitted over the telephone line 40 to the present facsimile machine 1. When the present facsimile machine 1 receives this ringing signal (i.e., S100 is YES), in S101 the CPU 12 controls the NCU 36 to connect the telephone line 40 and prepares for input from the telephone line 40.

Next, using the numeric pad of the portable telephone D, the user inputs the number "954" to request a change in the target facsimile machine. Because the user has not yet requested a status list, the determination in S102 will be NO and the determination in S103 will be YES so that the CPU 12 sends the reception tone to the portable telephone D in S104. The user then uses the numeric pad of the portable telephone D to input the telephone number (0*01234567989) of the facsimile machine C, during which time S105 through S108 are repeatedly executed until the inputted number "0*01234567989" is stored in the number memory 52 of the RAM 16 Then the user depresses the "190" key to indicate he or she has completed input of the telephone number (i.e., S106 is YES). The CPU 12 transmits a reception tone to the portable telephone D in S110. This informs the user that input of the telephone number for the new target facsimile machine is complete. The user then terminates the telephone call.

In the present facsimile machine 1, the program proceeds to S111, where the CPU 12 rewrites the telephone number stored in the forwarding number memory 62 to the telephone number "0*0123456789" stored in the telephone number memory 52 of the RAM 16. Therefore, the target facsimile machine to which facsimile messages are to be forwarded is changed from the facsimile machine B to the facsimile machine C. Also in S111, the reception mode is turned ON, the forwarding mode is turned OFF, and the timer 26 is reset to zero, so that the facsimile machine 1 will store incoming image informations into the image information memory 54. Because the user has already terminated the call, S112, S113 and S117 are repeatedly executed until the time monitored by the timer 26 in S112 runs out. When time runs out (i.e., S112 is YES), the CPU 12 disengages the telephone line in S120, thereby ending the forwarding number change routine.

When the user arrives as location C, he or she lifts the handset of the facsimile machine C and using the numeric pad dials the telephone number of the present facsimile machine 1. A ringing signal is transmitted over the telephone line 40 to the present facsimile machine 1. When the present facsimile machine 1 receives this ringing signal (i.e., S100 is YES), in S101 the CPU 12 controls the NCU 36 to connect the telephone line 40 and prepares for input from the telephone line 40. Using the numeric pad of the facsimile machine C, the user then inputs the number "961" allotted for requesting a status list, producing a YES determination in S102. The program proceeds to S114, where the CPU 12 sends a reception tone to the facsimile machine in S114 that informs the user that a status list is being transmitted.

The CPU 12 then prepares or produces image information for the status list in S115 and transmits the image information to the telephone line 40 in S116. Without replacing the handset, the user depresses the reception start switch on the facsimile machine C. The facsimile machine C starts reception of the transmitted status list and prints it out. The user can determine whether he or she inputted the correct telephone number of the target facsimile machine by checking the transmitted status list.

Figure 9:
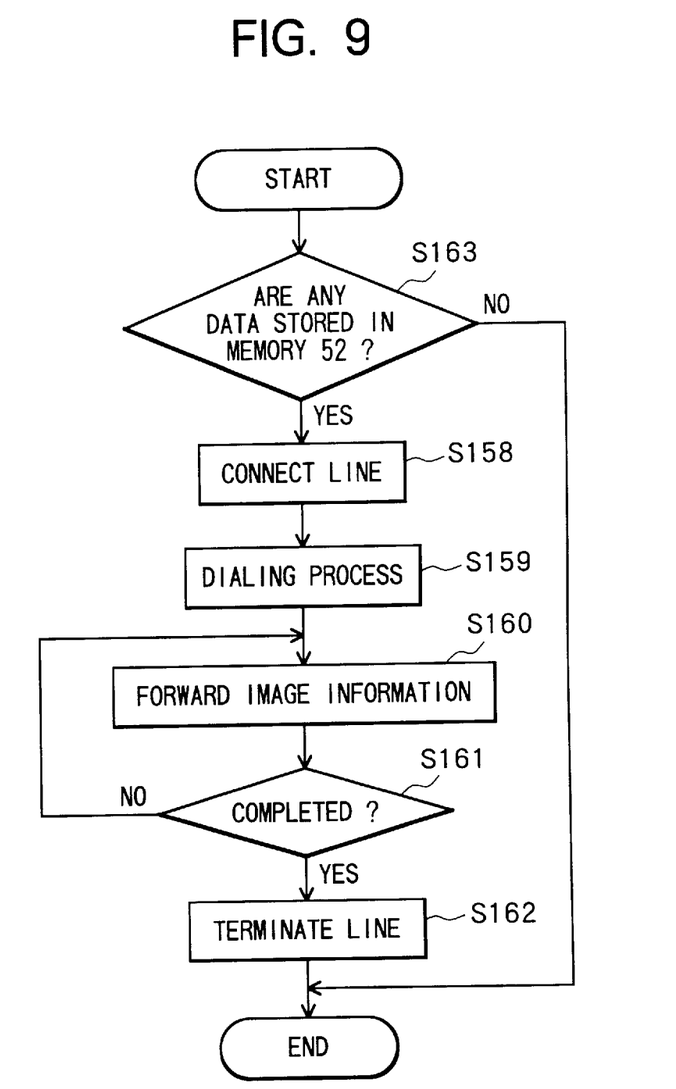
FIG. 9 is a flowchart of an image forwarding process.

Until the timer 26 reaches the predetermined time, the determination in S112 will remain NO. Also, because the user has already requested a status list, the determination in S113 will also remain NO. After the user confirms that the telephone number for new target facsimile machine C is listed correctly on the status list, he or she inputs using the numeric pad of the facsimile machine B the number "955" for confirming the correct number. This results in a YES determination in S117, where whether or not the confirmation number "955" has been inputted is determined. The program then proceeds to S118, where the CPU 12 transmits a reception tone to the facsimile machine C. This tone informs the user that the forwarding mode of the present facsimile machine 1 is being turned ON. The CPU 12 then turns ON the forwarding mode in S119, as a result of which the image forwarding routine of FIG. 9 is executed. Then, the CPU 12 controls the NCU 36 to disconnect the telephone line in S120. This brings the forwarding number change routine to an end.

On the other hand, if the telephone number listed on the status list is incorrect so the user does not input the confirmation number, the determination in S117 will continue to be NO until the time monitored by the timer 26 runs out, When time runs out and the determination in S112 is YES, the program will proceed to S120, where the CPU 12 controls the NCU 36 to disconnect the telephone line in S120, thereby bringing the forwarding number change routine to an end. The user can then again try and input the correct telephone number for facsimile machine C by again going through the above-described processes using the facsimile machine C. When the transmitted status list shows the correct telephone number, the user inputs the confirmation number (i.e., S117 is YES), the CPU 12 transmits the reception tone to the facsimile machine C in S118, the forwarding mode is turned ON in S119, and the forwarding routine is started.

Figure 7:
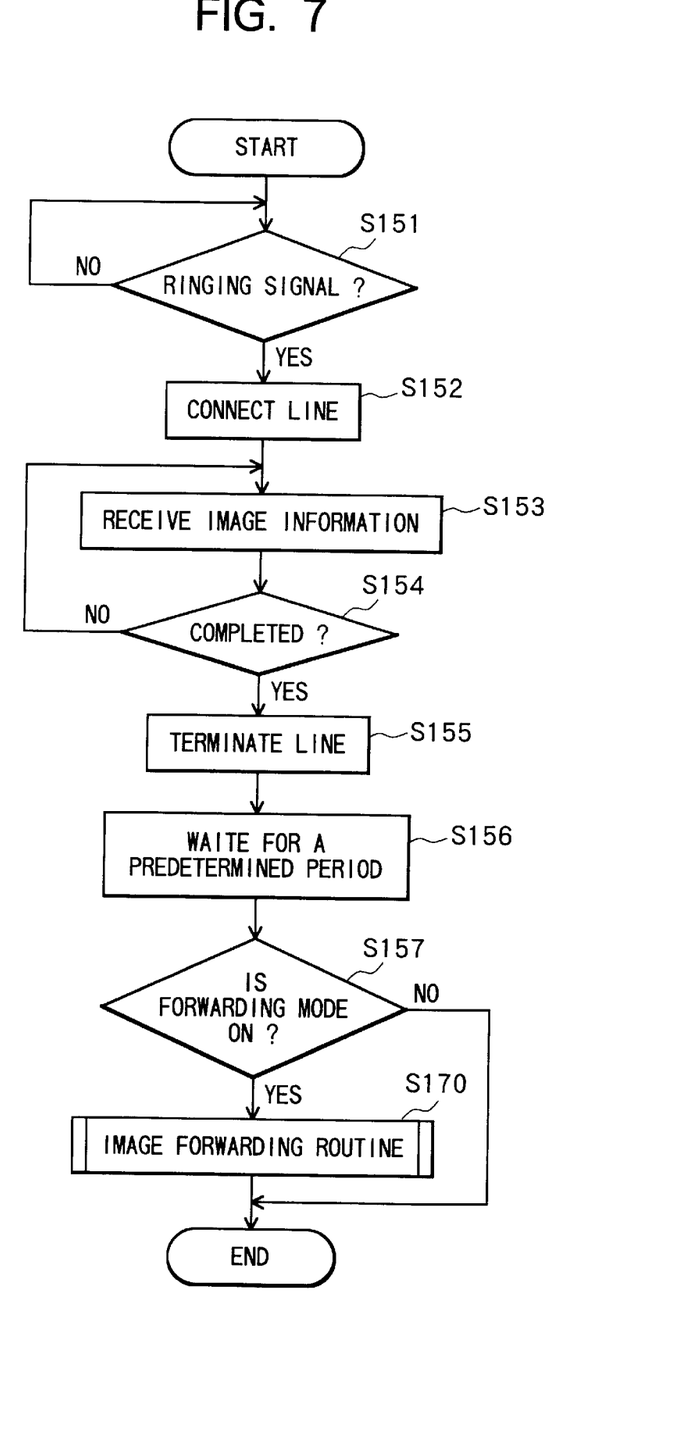
FIG. 7 is a flowchart of an image receiving process.

Next, an explanation of the image reception routine performed after the image reception mode is turned ON in Sill will be provided while referring to flowchart FIG. 7.

When the present facsimile machine 1 receives a ringing signal from the telephone line 40 (i e., S151 is YES), in S152 the CPU 12 controls the NCU 36 to connect the telephone line 40 and prepares for input from the telephone line 40. Image information transmitted over the telephone line 40 is stored in the image information memory 54 in S153 until reception of image information is completed (i.e., S154 is YES), whereupon the CPU 12 controls the NCU 36 to disconnect the telephone line 40 in S155. Next, in S156 the present facsimile machine 1 goes into standby for a predetermined duration of time (for example, six seconds) as monitored by the timer 26. After the predetermined duration of time has passed, whether or not the forwarding mode is ON is determined in S157. If not (i.e., S157 is NO), the image reception routine is completed. Thus, during the image forwarding mode is OFF, i.e., after the new forwarding number is stored in the EEPROM 18 in S111 and until the stored forwarding number is confirmed by the user in S117, the received image information is stored in the memory 54 without being forwarded to the target facsimile machine.

Next, the image forwarding routine of FIG. 9 executed in S121 after the forwarding mode is turned ON in S119 will be described below.

In S163, the CPU 12 first judges whether any incoming image information is stored in the image information memory 54 in the RAM 16. If no image information is stored by the image reception routine executed while the forwarding mode is OFF from S111 until S119 (i.e., No in S163), the forwarding routine ends. If some image information is received and stored in the memory 54 during the forwarding mode is OFF (Yes in S163), the CPU 12 connects telephone line 40 in S158 and performs a dialing process in S159 for the telephone number "0*0123456789" stored in the EEPROM 18 for the facsimile machine C.

Figure 8:
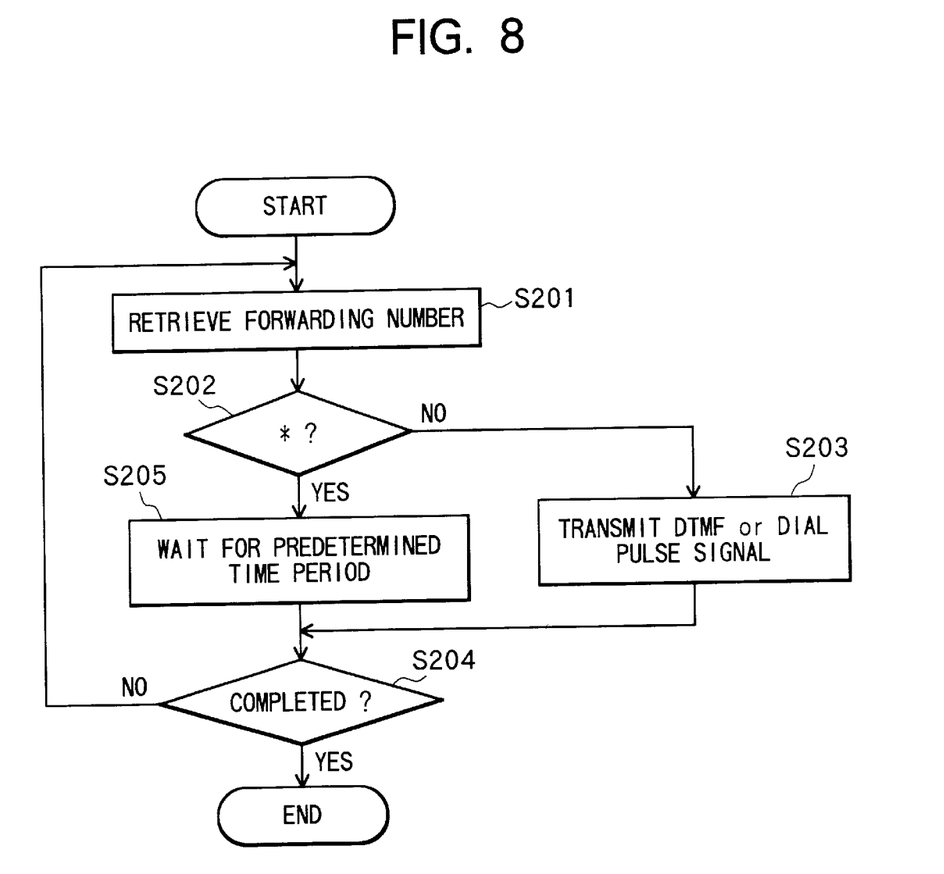
FIG. 8 is a flowchart of a dialing process.

The dialing process of S159 will be described while referring to the flowchart in FIG. 8.

In S201, the CPU 12 retrieves the first number of the telephone number for the facsimile machine C stored in the forwarding number memory 62 of the EEPROM 18. Next, whether or not the first number is the "*" mark or not is determined in S202. Because the first number is the number "0" (i.e., S202 is NO) in this case, the CPU 12 commands the telephone number generation circuit 25 to send a DTMF signal that corresponds to the number "0" to the telephone line 40 in S203. Whether dialing is completed or not is determined in S204. Dialing is not yet complete at this point, so the determination in S204 is NO. The program therefore returns to S201, where the "*" mark of the telephone number is retrieved.

When the "*" mark of the telephone number is retrieved in S201, the determination in S202 will be YES. The facsimile machine then waits about three seconds, as timed by the timer 26, before retrieving the next number of the telephone number. This three second pause is to allow the internal switchboard 44 to complete connecting the present facsimile machine 1 to the outside line 48. If the number following the first number "0" is immediately dialed while the present facsimile machine 1 is still not connected to the external line 48, the number will not be sent to the external switchboard 50 so that the present facsimile machine 1 may not be connected to the facsimile machine C. After the predetermined time of three seconds is up as measured by the timer 26, the program proceeds to S204. During dialing is not yet complete (i.e., S204 is NO), the program returns to S201 where the next number is retrieved.

By repeated executions of S201 through S204, the present facsimile machine serially retrieves the rest of the telephone number so that the external switchboard 50 sends a ringing sequence to the facsimile machine C.

Then, in S160 of FIG. 9, the image information stored in the image information memory 54 is transmitted to the facsimile machine C. When transmission is completed (i.e., S161 is YES), the CPU 12 controls the NCU 36 to terminate the connection in S162, thereby ending the image forwarding routine.

As apparent from the above description, if the present facsimile machine 1 receives image information during the reception mode is ON but the forwarding mode is OFF (i.e., from S111 to S119), the present facsimile machine merely receives and stores the incoming image information into the RAM 16. When the inputted forwarding number is confirmed by the user in S118 and the forwarding mode is turned ON, the stored image information is forwarded to the target facsimile machine.

Next, an explanation of the image forwarding routine performed when the present facsimile machine receives facsimile data after the forwarding mode is turned ON in S119 will be provided while referring to flowchart FIG. 7.

When an incoming signal is received, the telephone line 40 is connected and the data of the received signal is stored in the image information memory 54 in S151 through S155 as described already. Next, in S156 the present facsimile machine 1 goes into standby for the predetermined duration of time (for example, six seconds) as monitored by the timer 26. After the predetermined duration of time has passed, whether or not the forwarding mode is ON is determined in S157. In this example, the forwarding mode is ON (i.e., S157 is YES), the image forwarding routine of FIG. 9 is executed in S170.

In the image forwarding routine, S163 judges whether any image information is stored in the memory 54. Because the image information which has been just received by the present facsimile machine 1 in S153 is stored in the memory 54, the program proceeds to S158 so the CPU 12 again connects telephone line 40 in S158 and performs in S159 the dialing process for the telephone number "0*0123456789" stored in the EEPROM 18 for the facsimile machine C. Then, in S160 of FIG. 9, the image information stored in the image information memory 54 is transmitted to the facsimile machine C. When transmission is completed (i.e., S161 is YES), the CPU 12 controls the NCU 36 to terminate the connection in S162, thereby ending the image information transmission routine.

As described above, the facsimile machine of the present embodiment can properly transmit image information even when connected to an in-house switchboard.

According to the present embodiment, upon receiving a command for changing a target facsimile machine (Yes in S103), the present facsimile machine 1 receives the new forwarding number (S105–S108). The present facsimile machine 1 changes a forwarding number stored in the EEPROM 18 to the newly inputted forwarding number. Then, the present facsimile machine 1 starts receiving incoming image information from remote facsimile machines (S111) and stores them into the RAM 16. Upon receiving a command for transmission of a status list (Yes in S113), the present facsimile machine 1 produces a status list indicating the newly-stored forwarding number (S115). Then, the present facsimile machine 1 transmits the status list to a remote facsimile machine which has transmitted the status list transmission command. The user existing at that remote facsimile machine visually confirms the newly-stored forwarding number appearing on the status list, and transmits a transmission start command to the present facsimile machine 1. Upon receiving the transmission start command (Yes in S117), the present facsimile machine 1 starts transmitting the image information presently stored in the RAM 16 (S119).

As described above, the facsimile machine according to the present invention allows visual confirmation of telephone numbers for target facsimile machines to which image information is to be forwarded. Therefore, a user can be sure that he or she correctly inputted the telephone number or can correct the number if it is incorrect.

The facsimile machine according to the present invention starts storage of any incoming image information when a target facsimile machine is changed to a new facsimile machine, to which image information is desired to be forwarded. The user confirms the accuracy of the new target facsimile machine, based on distinction image information transmitted from the facsimile machine of the present invention. Then, the user transmits a confirmation signal to the present facsimile machine. Upon receipt of the confirmation signal, the facsimile machine of the present invention starts forwarding any stored information. Thus, the user can command start of forwarding, after visually confirming the telephone number of the new target facsimile machine.

When the user designates by telephone a new target facsimile machine to which image information is to be forwarded, image information received by the present facsimile machine is not forwarded to the new target facsimile machine until the user later visually confirms accuracy of new telephone number based on the distinction image information sent from present facsimile machine. When the user visually confirms the new telephone number, he or she also transmits confirmation signal to the present facsimile machine, whereupon the present facsimile machine starts forwarding information to the new target facsimile machine. Even if the user accidently inputted the incorrect new telephone number over the telephone, the present facsimile machine will not forward image information to an incorrect facsimile machine.

Further, with this confirmation method, the confirmation routine can be executed by only providing the present facsimile machine with a control program for execution. Therefore, there is no need to include a voice circuit or other component for producing a synthetic voice by which the user confirms accuracy of the telephone number. Therefore the facsimile machine with a transmission function can be inexpensively provided.

As described above, according to the present invention, when receiving from a remote source, such as a remote facsimile machine or a remote telephone, a command for changing target facsimile machines, the facsimile machine of the present invention receives a telephone number for the new target facsimile machine. The telephone number already stored in the memory is then changed to the new telephone number. As a result of the change in the telephone number into the new telephone number, the image information memory starts storing image information when receiving the image information from remote facsimile machines. The facsimile machine of the present invention prepares distinction image information including an image of the new telephone number stored in the memory. Upon receiving an appropriate request from a remote source, the distinction image information is transmitted to a remote facsimile machine where the user exists. The user confirms, using the distinction image information, that the inputted telephone number for the new target facsimile machine is correct, then transmits to the facsimile machine of the present invention a command to start transmission of image information. Upon receiving the command, the facsimile machine of the present invention starts forwarding the image information stored in the image information memory to the new target facsimile machine.

The source having transmitted the command for changing the target facsimile machine to the facsimile machine of the present invention may be differentiated from the source to which the facsimile machine of the present invention transmits the distinction image information.

While the invention has been described in detail with reference to specific embodiments thereof, it would be apparent to those skilled in the art that various changes and modifications may be made therein without departing from the spirit of the invention, the scope of which is defined by the attached claims.

For example, in the above-described embodiment, an image showing the inputted number of the new target facsimile machine is transmitted to the facsimile machine where the user exists for the user's confirmation. However, a sound indicative of the inputted number of the new target facsimile machine can be transmitted to the facsimile machine for the user's confirmation. Upon receiving the confirmation, the present facsimile machine may start forwarding incoming image information to the new target facsimile machine.

What is claimed is:

1. A facsimile machine capable of forwarding image information received from remote facsimile machines to a desired target facsimile machine, the facsimile machine comprising:

reception means for receiving a telephone number of a target facsimile machine, to which image information, received at the reception means, is desired to be forwarded, the reception means having a first reception means component for receiving the telephone number, a second reception means component for receiving the image information, and a third reception means component for receiving a request command for transmission of distinction image information;

storage means for storing the received telephone number of the target facsimile machine;

distinction image information preparation means for preparing information on a distinction image which includes an image of the received telephone number stored in the storage means when the third reception means component receives the request command for transmission of distinction image information from a remote information transmission source;

distinction image information transmission means for transmitting the distinction image information prepared by the distinction image information preparation means to the remote information transmission source; and image information forwarding means for forwarding image information received from a remote facsimile machine to the target facsimile machine whose telephone number is stored in the storage means the image information forwarding means performing the forwarding operation toward the target facsimile machine after the distinction image transmission means transmits the distinction image information to the remote information transmission source.

2. A facsimile machine as claimed in claim 1, wherein the reception means receives a request command for changing the desired target facsimile machine of which the received telephone number has been already stored in the storage means to a newly-desired target facsimile machine, to which newly desired image information is to be forwarded, the reception means receiving a new telephone number of the newly-desired target facsimile machine after receiving the change request command, the storage means rewriting the already-stored received telephone number with the new telephone number.

3. A facsimile machine as claimed in claim 1, wherein the reception means receives the change request command and the new telephone number of the newly-desired target facsimile machine from a remote information transmission source, and wherein the reception means receives the distinction image request command from the remote information transmission source, the distinction image information transmission means transmitting the distinction image information to the remote information transmission source that has requested the distinction image request command.

4. A facsimile machine as claimed in claim 1, wherein the reception means receives the change request command and the telephone number of the newly-desired target facsimile machine from a remote information transmission source, and wherein the reception means receives the distinction image request command from another remote information transmission source, the distinction image information transmission means transmitting the distinction image information to the remote information transmission source that has requested the distinction image request command.

5. A facsimile machine as claimed in claim 1, further comprising image information memory means for storing incoming image information received after the storage means rewrites the already-stored received telephone number with the new telephone number.

6. A facsimile machine as claimed in claim 5, wherein the reception means receives a request command for starting transmission of the incoming image information stored in the image information memory means to the newly-desired target facsimile machine, further comprising image information transmission means for transmitting the incoming image information stored in the image information memory means to the newly-desired target facsimile machine, upon receipt of the transmission start request command.

7. A facsimile machine, capable of forwarding image information received from remote facsimile machines to a desired target facsimile machine, the facsimile machine comprising:

storage means for storing a telephone number of a target facsimile machine;

reception means for receiving a new telephone number of a new target facsimile machine, to which incoming image information is newly desired to be forwarded, target changing means for changing the telephone number stored in the storage means to the new telephone number received by the reception means;

image information memory means for storing incoming image information received from remote facsimile machines;

information preparation means for preparing distinction information which includes information on the new telephone number stored in the storage means;

distinction information transmission means for transmitting the distinction information;

image information transmission means for transmitting the incoming image information stored in the image information memory means to a target facsimile machine, a telephone number of which is being presently stored in the storage means; and control means for controlling the image information transmission means to stop transmitting the incoming image information after the target changing means changes the telephone number stored in the storage means to the new telephone number received by the reception means and until the reception means receives a transmission start command for requesting transmission of the incoming image information, wherein the control means controls the image information memory means to start storing incoming image information transmitted from remote facsimile machines, after the target changing means changes the telephone number stored in the storage means to the new telephone number.

8. A facsimile machine of claim 7, wherein the control means controls the reception means to start receiving the new telephone number of the new target facsimile machine, upon receiving a change request command for changing the target facsimile machine into the new target facsimile machine.

9. A facsimile machine of claim 8, wherein the information preparation means prepares a distinction image information on a distinction image which includes an image of the new telephone number stored in the storage means, the distinction information transmission means transmitting the distinction image information.

10. A facsimile machine of claim 8, wherein the information preparation means prepares a distinction sound information on a distinction sound which includes a sound indicative of the new telephone number stored in the storage means, the distinction information transmission means transmitting the distinction sound information.

11. A facsimile machine as claimed in claim 8, wherein the change request command is transmitted from a remote source and wherein the distinction information transmission means transmits the distinction information to a source that is different from the source that has transmitted the change request command.

12. A facsimile machine as claimed in claim 8, wherein the change request command is transmitted from a remote source and wherein the distinction information transmission means transmits the distinction information to a source that is the same as the source that has transmitted the change request command.

13. A facsimile machine of claim 7, wherein the control means controls the distinction information transmission means to transmit the distinction information, upon receiving a request for transmission of the distinction information from a remote source, the distinction information transmission means transmitting the distinction information to the remote source that has transmitted the distinction information transmission request.

14. A facsimile machine as claimed in claim 1, wherein the first reception means component is one of a RAM and an EEPROM and wherein the second reception means component is a remaining one of the RAM and the EEPROM.

* * * * *